(12) United States Patent
Dai et al.

(10) Patent No.: US 11,889,377 B2
(45) Date of Patent: Jan. 30, 2024

(54) WIRELESS SENSING BANDWIDTH AGGREGATION

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/464,225

(22) Filed: Sep. 1, 2021

(65) Prior Publication Data

US 2023/0065713 A1    Mar. 2, 2023

(51) Int. Cl.
*H04W 4/02* (2018.01)
*H04W 4/021* (2018.01)
*H04W 8/00* (2009.01)
*H04W 24/10* (2009.01)
*H04W 72/044* (2023.01)

(52) U.S. Cl.
CPC ........... *H04W 4/021* (2013.01); *H04W 4/025* (2013.01); *H04W 8/005* (2013.01); *H04W 24/10* (2013.01); *H04W 72/044* (2013.01)

(58) Field of Classification Search
CPC ..... H04W 4/021; H04W 4/025; H04W 8/005; H04W 24/10; H04W 72/044
USPC ...................................................... 455/456.1
See application file for complete search history.

(56) References Cited

U.S. PATENT DOCUMENTS

| | | | |
|---|---|---|---|
| 2016/0088635 A1* | 3/2016 | Davydov | H04L 1/1822 370/329 |
| 2017/0339592 A1* | 11/2017 | Yi | H04B 17/327 |
| 2019/0004512 A1* | 1/2019 | Liu | G05D 1/0038 |
| 2021/0076417 A1 | 3/2021 | Bayesteh et al. | |
| 2021/0149016 A1 | 5/2021 | Murakami et al. | |

OTHER PUBLICATIONS

International Search Report and Written Opinion dated Jan. 9, 2023 from corresponding PCT Application No. PCT/US2022/075470.

* cited by examiner

*Primary Examiner* — Joel Ajayi
(74) *Attorney, Agent, or Firm* — Arent Fox, LLP

(57) ABSTRACT

In an aspect of the disclosure, a method, a computer-readable medium, and an apparatus are provided. In some aspects, the apparatus may be a user equipment (UE) or a component thereof; however, in some other aspects, the apparatus may be a base station or a component thereof. The apparatus may be configured as a first wireless node that transmits, to a second wireless node, capability information indicating a capability of the first wireless node to perform sensing when operating with carrier aggregation. The apparatus may communicate a set of sensing signals on a plurality of carriers between the first wireless node and the second wireless node based on the capability information. The apparatus also may sense an object based on a set of calculations associated with an aggregated sensing bandwidth of the set of sensing signals.

27 Claims, 8 Drawing Sheets

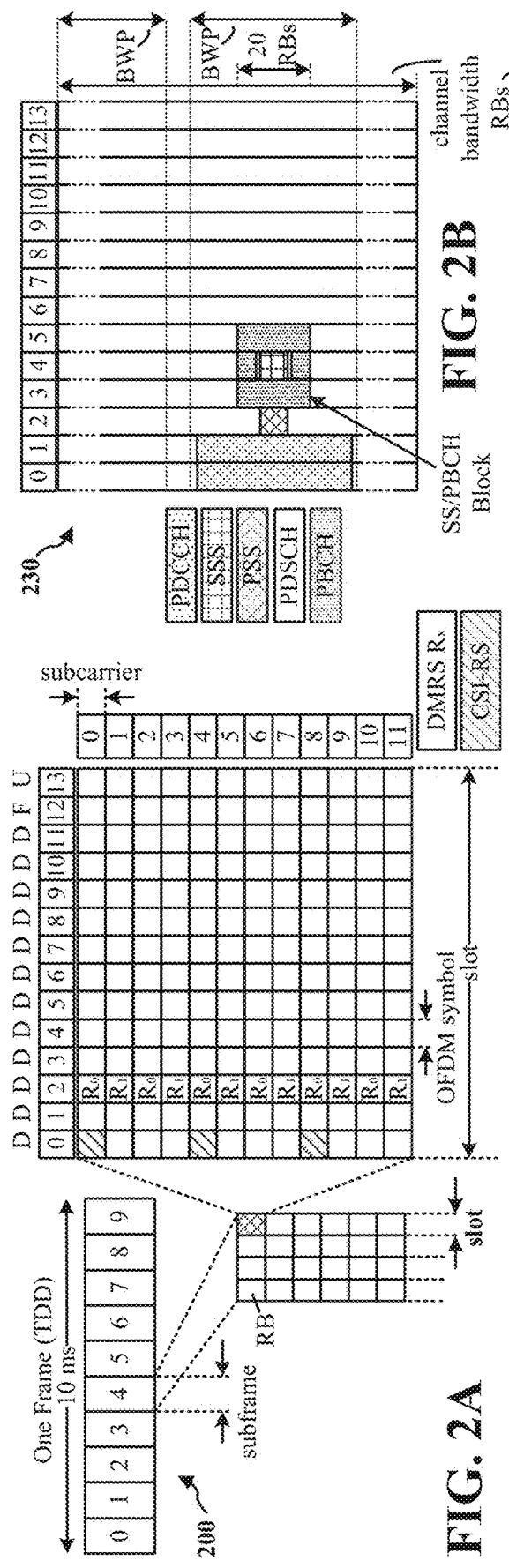
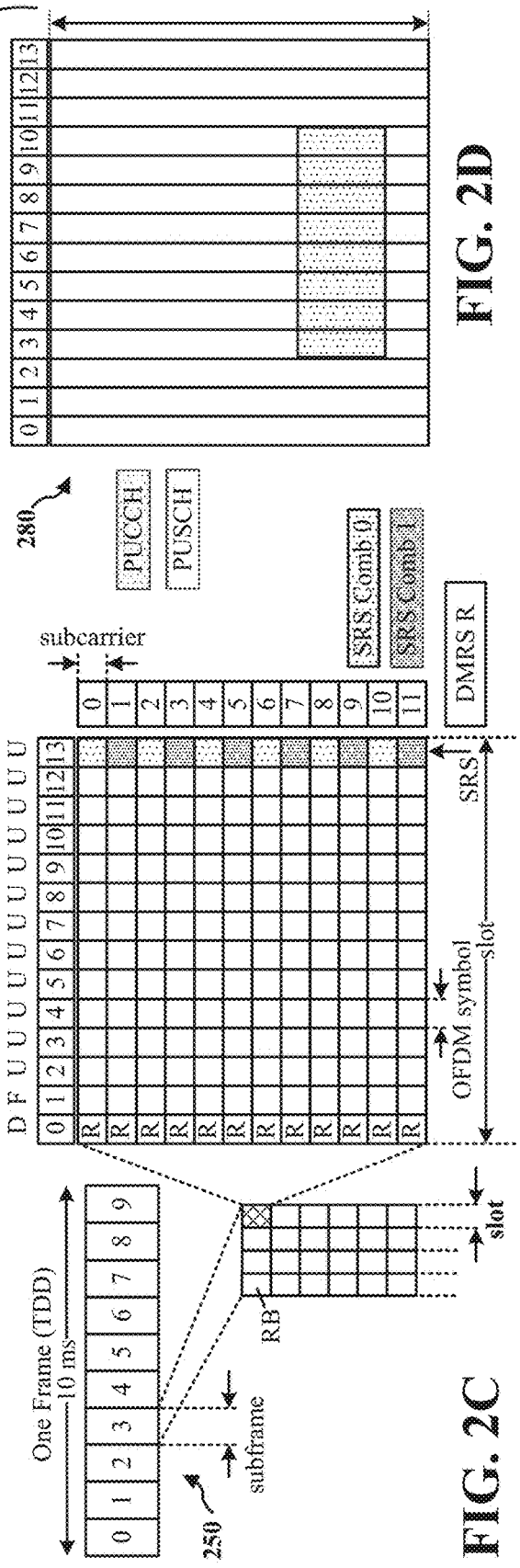
FIG. 2A
FIG. 2B
FIG. 2C
FIG. 2D

WIRELESS SENSING BANDWIDTH AGGREGATION

BACKGROUND

Technical Field

The present disclosure generally relates to communication systems, and more particularly, to wireless sensing bandwidth aggregation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless nodes, such as base stations and user equipment (UE), may be configured with components that allow for sensing objects in the environment. For example, a wireless node may include an antenna element(s) with sensitivity, gain, etc. that is sufficient for bistatic sensing. Sensing objects distributed throughout an environment proximate to a wireless node may be useful in a variety of contexts, such as beamforming, Internet of Things (IoT) communication, mapping, safety, and so forth. For example, sensing objects in the an environment proximate to a vehicle may be useful in many vehicle-to-everything (V2X) contexts as a way to obtain real-time positions of other vehicles on a road, positions of pedestrians, and other objects that should generally be avoided when operating a vehicle. Regardless of node capabilities, object sensing may be significantly hampered by limitations in the range resolution. Examples of sensing an object in the environment may include detecting the object's location, speed, direction of travel, among others, by transmitting signals from a wireless node on multiple component carriers in accordance with its carrier aggregation capabilities.

As described herein, such object sensing may be improved by increasing the sensing bandwidth, which may provide a higher range resolution. However, the sensing bandwidth may be capped by the allocated resource spectrum (e.g., a bandwidth part (BWP), carrier BWP, etc.). Therefore, a need exists for providing a larger sensing bandwidth to improve the range resolution in RF sensing.

To that end, various aspects of the present disclosure enable a wireless node that is operating with carrier aggregation to aggregate the sensing bandwidth on different carriers to increase the overall sensing bandwidth in comparison to other approaches, such as approaches in which the sensing signals are transmitted on a single (or same) carrier that are capped by the carrier bandwidth. With increased accuracy and resolution through configuration and knowledge of the capabilities of the sensing wireless node for sensing bandwidth aggregation, some object sensing by a wireless node may be improved, including bistatic sensing.

In an aspect of the disclosure, a method, a computer-readable medium, and an apparatus are provided. In some aspects, the apparatus may be a user equipment (UE) or a component thereof; however, in some other aspects, the apparatus may be a base station or a component thereof. The apparatus may be configured as a wireless node that transmits, to a second wireless node, capability information indicating a capability of the first wireless node to perform sensing when operating with carrier aggregation. The apparatus may be further configured to communicate a set of sensing signals on a plurality of carriers between the first wireless node and the second wireless node based on the capability information. The apparatus may be further configured to sense an object based on a set of calculations associated with an aggregated sensing bandwidth of the set of sensing signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
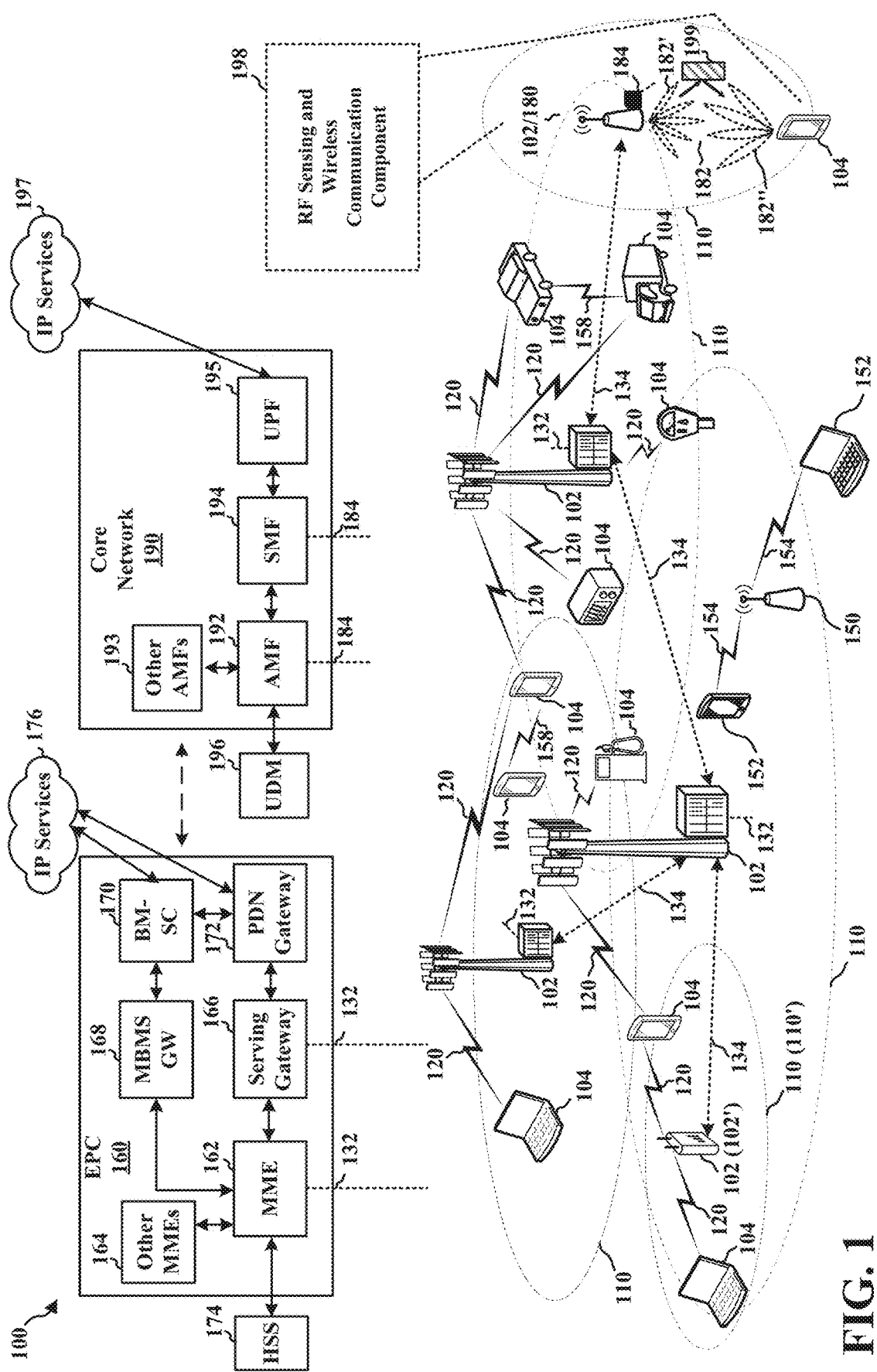
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, a base station 102 operating as an IAB donor may provide a link to the one of the EPC 160 or the core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and JAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a wireless node, such as one of the UE 104 or the base station 102/180, may include a radio frequency (RF) sensing and wireless communication component 198 to communicate sensing signals between the wireless node and another wireless node, such as the other of the UE 104 and the base station 102/180, e.g., for bistatic sensing. The wireless node may subsequently sense an object based on a set of measurements associated with an aggregated sensing bandwidth of the set of sensing signals. For example, if the wireless node is operating with carrier aggregation, the overall bandwidth of the sensing signals on different carriers can be aggregated to improve range resolution.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
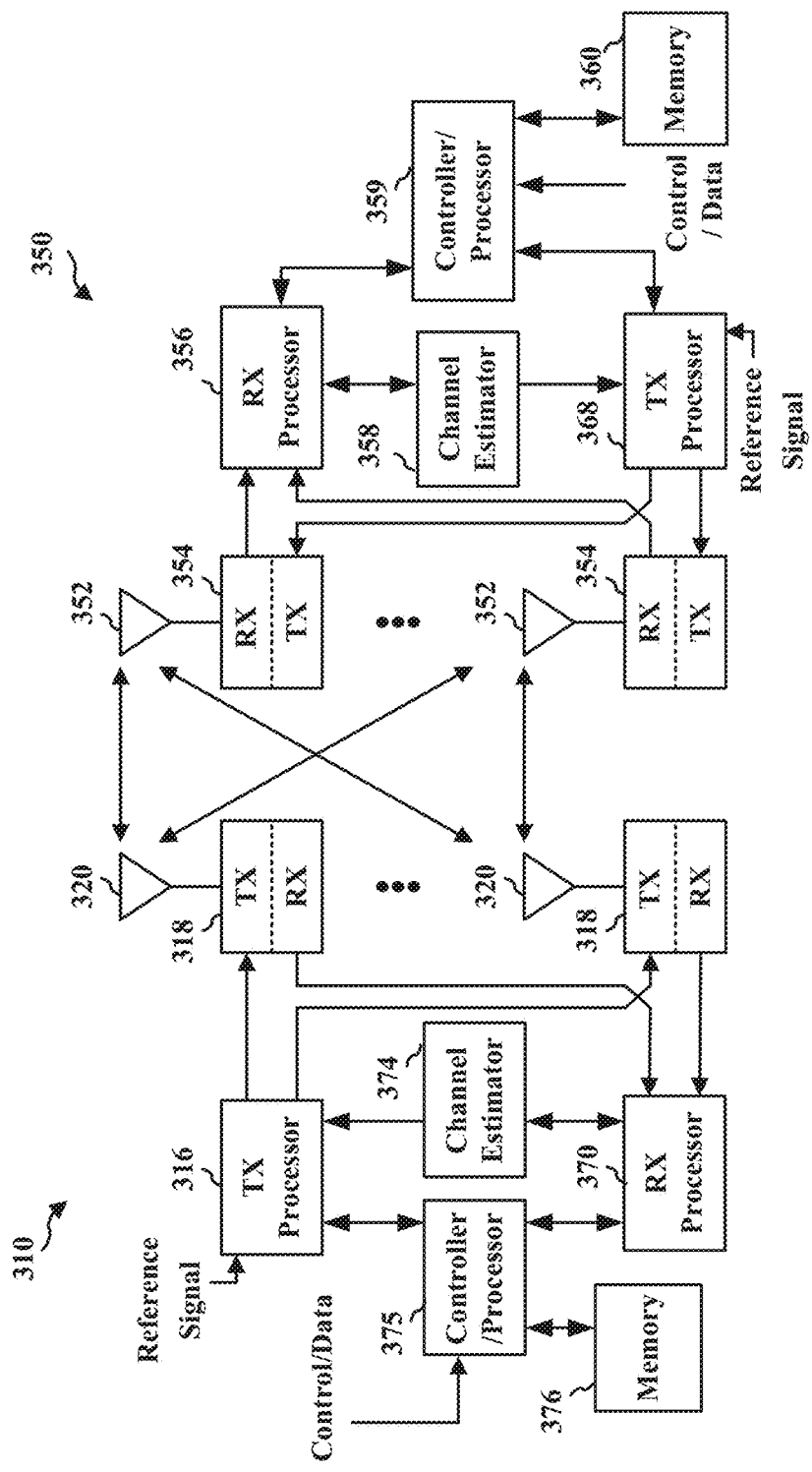
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a RF carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the RF sensing and wireless communication component 198 of FIG. 1.

In some other aspects, at least one of the TX processor 316, the RX processor 370, and the controller/processor 375 may be configured to perform aspects in connection with the RF sensing and wireless communication component 198 of FIG. 1.

Figure 4:
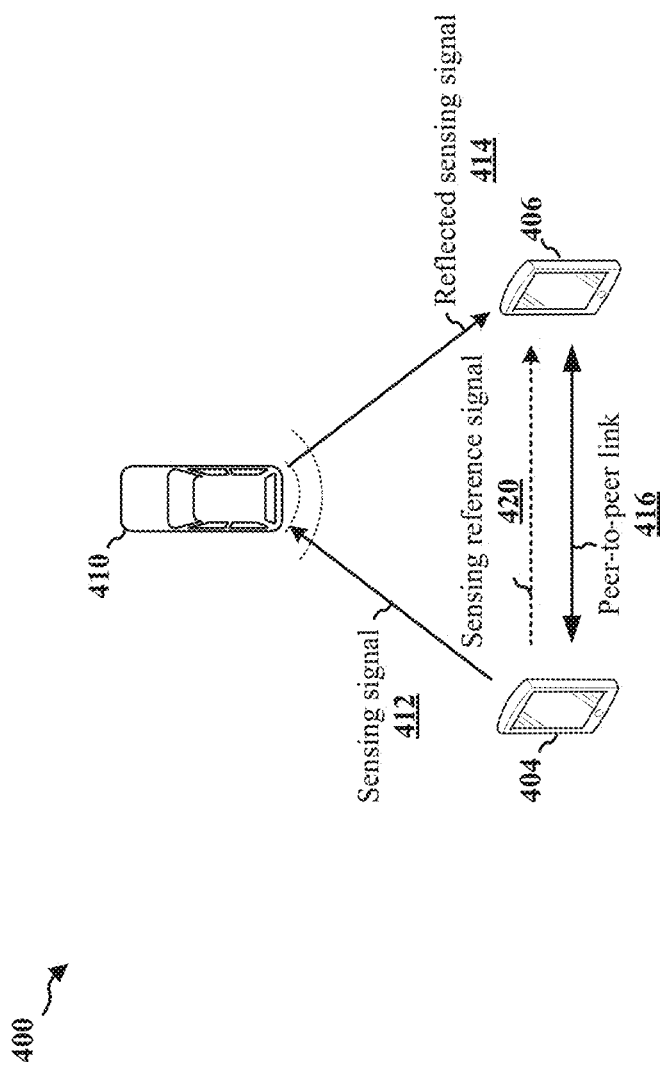
FIG. 4 is a diagram illustrating an example of sensing signal transmission by a UE for bistatic sensing with another UE.

FIG. 4 is a diagram 400 illustrating an example of sensing signal transmission by a UE 404 for bistatic sensing with another UE 406. In some aspects, each of the UEs 404, 406 may be referred to as a wireless node. The UEs 404, 406 may establish a communication link 416 on a sidelink discovery channel, such as a PSDCH, and may communicate on sidelink control and/or data channels, such as a PSCCH and/or PSSCH, respectively.

With the increasing complexity and density of antenna elements configurations, wireless devices may be able to perform some RF sensing. For example, some or all antennas of a wireless node may be operable as radars, able to transmit and receive waveforms with sufficient accuracy and resolution. The antennas may be treated as radar with RF sensing capabilities, and used with appropriate detection algorithms, may combine to function as a consumer-level radar able to send and receive waveforms for bistatic sensing.

In some aspects, bistatic sensing may include the use of RF components of wireless nodes (e.g., the UEs 404, 406, BS 452, etc.) being employed as a radar network. For example, with bistatic sensing, the UEs 404, 406 may form a radar network using signals transmitted via at least one antenna of the transmitter UE 404 and received via at least one antenna of the receiver UE 406. In order to sense a target object 410, the UEs 404, 406 may localize themselves relative to one another, and may calculate the channel impulse response (CIR) on each of a set of channels. An object 410 in the environment, located remotely from both UEs 404, 406, may be sensed based on the calculated CIRs and changes thereto over time. Potentially, the object 410 can be sensed with a degree of precision that captures contours or facets of the sensed object, e.g., such that the object 410 can be classified and an associated set of operations may be performed. In some aspects, a sensing UE 404 may derive a position of the object 410 based on sensing the object 410. In some other aspects, the sensing UE 404 may generate an image (e.g., a spectral image) of the object 410 based on sensing the object 410.

This concept of bistatic sensing may be extended to multistatic sensing, which may include multiple transmitters and receivers that are spatially diverse. For example, some multistatic sensing may use multiple spatially diverse bistatic sensing nodes (although multiple spatially diverse monostatic sensing nodes may also be used in different multistatic sensing systems). Multistatic sensing may include data fusion from the spatially diverse nodes. Accordingly, as some multistatic sensing systems are dependent upon bistatic sensing systems, it will be appreciated that the various concepts and aspects described herein may be extended to multistatic sensing.

Such RF sensing may be useful in numerous areas, such as IoT, vehicle-to-everything (V2X), and so forth. For example, RF sensing may provide information related to health monitoring, gesture recognition, contextual information acquisition (e.g., ranging, location tracking, etc.), and automotive radar (e.g., smart cruise control, collision avoidance).

While wireless nodes having full duplex capability may perform monostatic sensing, the full duplex capability may not be available at every wireless node. For some wireless nodes, such as those having half duplex capability, bistatic sensing may be used to sense an environment. Bistatic sensing involves two wireless nodes (and multistatic sensing involves more than two wireless nodes), which may coordinate to exchange some positioning information that may be used for such bistatic sensing.

As an example, a sensing UE 404 may have an established (peer-to-peer) link 416 with another UE 406 (e.g., an "assistant node" in the context of bistatic sensing by the sensing UE 404). The sensing UE 404 may transmit a burst of sensing signals 412 to the assistant UE 406 for bistatic sensing in the environment. In some aspects, the sensing UE 404 may simultaneously transmit the burst of sensing signals on different carriers at the same (or at least partially overlapped) time occasion. The object 410 may reflect the sensing signals 412, resulting in reflected sensing signals 414 (on different carriers) being directed toward the assistant UE 406. The assistant UE 406 may receive some or all of the reflected sensing signals 414 and, as further described below, may perform various measurements thereon. In some aspects, the assistant UE 406 may gather the measurements of the reflected sensing signals such that the overall sensing bandwidth of the sensing signals on different carriers can be aggregated. Although the bandwidth may be capped by the bandwidth of a carrier BWP associated with each sensing signal, the aggregation of the overall bandwidth of the sensing signals can produce a larger bandwidth for sensing, resulting in a higher range resolution. The assistant UE 406 may transmit the measurements to the sensing UE 404 over the peer-to-peer link 416, and the sensing UE 404 may use those measurements to sense an object in the environment.

In some aspects, RF sensing may be based on the NR air interface. Like conventional radar, the NR air interface-based radar can estimate range (e.g., distance), speed (e.g., Doppler), and angle (e.g., Angle of Arrival) of targets. In some aspects, a specific reference signal (e.g., the sensing reference signal 420) may be required as an interrogation signal. The performance (e.g., resolution and maximum values of range, velocity and angle) may depend on implementation of a framework for the sensing reference signal 420. As illustrated in FIG. 4, the UE 406 may communicate a sensing reference signal 420 as an interrogation signal to the UE 406 on sidelink control and/or data channels, such as a PDCCH and/or PDSCH, respectively.

In RF sensing, a larger bandwidth of sensing signals corresponds to a higher range resolution of a sensed object. However, the bandwidth may be capped by the bandwidth of a BWP, carrier BWP, etc. In this regard, if the sensing UE 404 is operating with carrier aggregation, the overall bandwidth of the sensing signals on different carriers can be aggregated to improve the range resolution of the sensed object.

Figure 5:
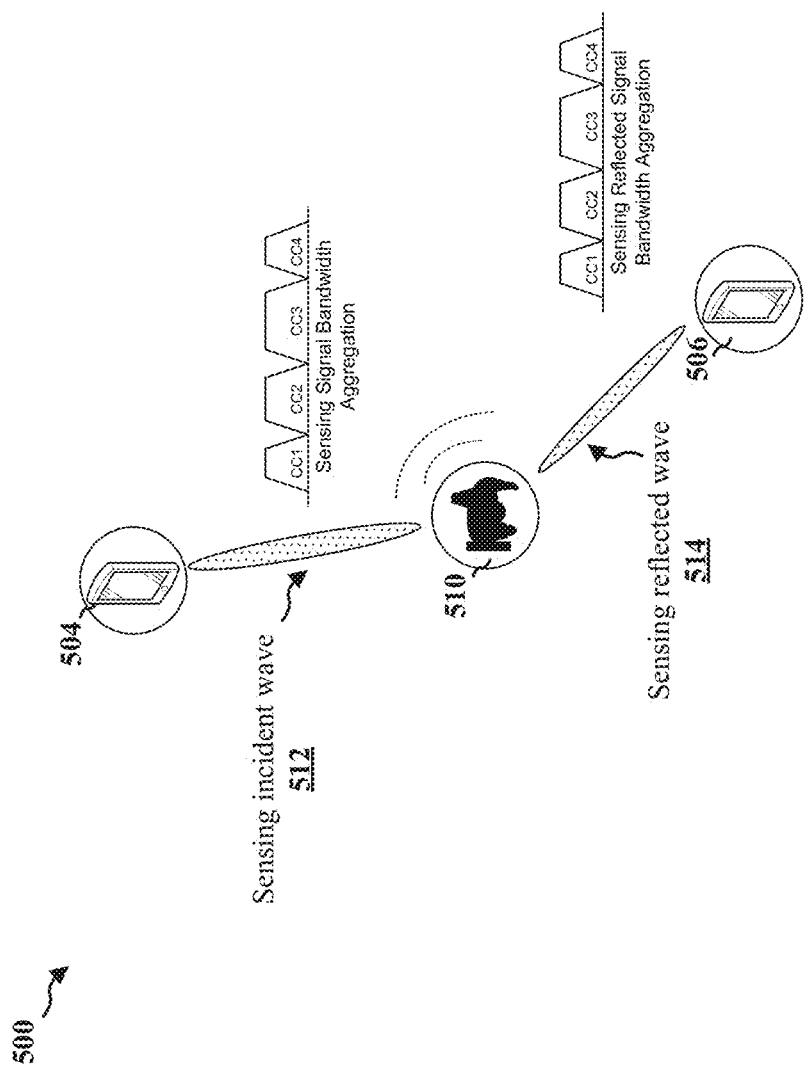
FIG. 5 is a diagram illustrating another example of sensing signal transmission by a UE for bistatic sensing with another UE.

FIG. 5 is a diagram illustrating another example of sensing signal transmission by a UE 504 for bistatic sensing with another UE 506. In general, sensing signals transmitted between the UE 504 and the UE 506 may be expected to have sufficient sensing bandwidth for realization of accurate bistatic sensing. However, the bandwidth of a sensing signal may be capped by the bandwidth of the allocated BWP (or carrier BWP, etc.).

In one example scenario 500, for example, a sensing transmitter node 504 (e.g., a UE) attempts to sense the environment, e.g., to find a target object 510 positioned therein. In some aspects, the sensing transmitter node 504 may sense the environment by transmitting RF waves, such as RF waves in a mmW (e.g., EHF or near-EHF) frequency range. Potentially, the sensing transmitter node 504 and sensing receiver node 506 may utilize a single component carrier for RF sensing, which may hamper a radar measurement (e.g., range, speed, angle) based on the limited sensing bandwidth on the single component carrier.

In this regard, the sensing transmitter node 504 may lack sufficient bandwidth capabilities to transmit beams that have a high enough spatial resolution to accurately sense the target object 510 in an environment, particularly when the object 510 is complicated and/or multi-faceted (e.g., human facial features or expressions). The sensing transmitter node 504, however, may overcome this deficiency by sharing its aggregated sensing bandwidth capabilities to other nodes in the environment (e.g., the sensing receiver node 506) to operate with carrier aggregation and allow for a larger bandwidth in sensing the object 510, thus resulting in an improved resolution of the object 510.

To that end, the sensing transmitter node 504 may transmit, to a second wireless node (e.g., the sensing receiver node 506), capability information indicating that the sensing transmitter node 504 is operating with carrier aggregation. For example, the sensing transmitter node 504 may generate the capability information to indicate a maximum aggregated sensing bandwidth per band, a band combination or wireless node (e.g., UE). The capability information also may indicate a maximum sensing bandwidth per carrier as a function of a subcarrier spacing. Additionally, the capability information may indicate that the first wireless node has capability to perform simultaneous sensing on a set of sensing signals as a function of a subcarrier spacing combination. Effectively, the carrier aggregation may enable aggregation of the sensing bandwidth for detailed and accurate bistatic sensing even though an individual component carrier may be capped to a limited bandwidth size. To that end, use of the aggregated sensing bandwidth may extend the range at which a target object is able to be sensed, as a larger bandwidth of the sensing signals may improve the range resolution, increasing the distances at which sensing signals are useful for various calculations related to bistatic sensing (e.g., CIR calculations). In some aspects, the sensing transmitter node 504 may generate the capability information based at least in part on a resource pool indicating aggregation capability of radio resources associated with the first wireless node for sensing bandwidth aggregation. In some aspects, the resource pool may be a frequency resource pool with UE sensing bandwidth aggregation capabilities that also can be created for a multistatic radar sensing environment so that a UE in that environment can keep track of the sensing frequencies available for aggregation.

As further described herein, the sensing transmitter node 504 and the sensing receiver node 506 may communicate UE capability information that includes various parameters associated with aggregated sensing bandwidth that may be functional prerequisites to some bistatic sensing calculations. In some instances, this UE capability information may be communicated over a downlink/uplink channel with a base station (e.g., gNB). In other instances, this UE capability information may be communicated over a sidelink channel. In still other instances, this UE capability information may be communicated over a fronthaul/backhaul channel.

In some aspects, the sensing transmitter node 504 may determine whether simultaneous sensing of the set of sensing signals on the one or more different carriers is supported on the sensing transmitter node 504. If simultaneous sensing is supported on the sensing transmitter node 504, the sensing transmitter node 504 may generate the capability information that includes a first indication of a simultaneous sensing capability for a wireless node (e.g., the sensing transmitter node 504) when the simultaneous sensing of the set of sensing signals on the one or more different carriers is supported on the sensing transmitter node 504. In some examples, the simultaneous sensing capability includes frequency-division multiplex sensing on the one or more different carriers over a same (or at least partially overlapping) time occasion. If simultaneous sensing is not supported on the sensing transmitter node 504, the sensing transmitter node 504 may generate the capability information that includes a second indication of a non-simultaneous sensing capability for the sensing transmitter node 504 when the simultaneous sensing of the set of sensing signals on the one or more different carriers is not supported on the sensing transmitter node 504. In some examples, the non-simultaneous sensing capability includes time-division multiplex sensing on the one or more different carriers. In some aspects, the maximum aggregated sensing bandwidth may be different between the simultaneous sensing capability and the non-simultaneous sensing capability.

In some aspects, the sensing transmitter node 504 may transmit, to the sensing receiver node 506, a request for modifying a sensing configuration associated with the sensing transmitter node 504. In some aspects, the request may be referred to as a UE assistance information (UAI) message. In turn, the sensing transmitter node 506 can receive a response to the request from the sensing receiver node 506. In some aspects, the response indicates a modification in one or more parameters associated with the aggregated sensing bandwidth. For example, the request indicates a change in one or more of a maximum aggregated sensing bandwidth parameter of the sensing configuration or a maximum sensing bandwidth per carrier parameter of the sensing configuration.

In one configuration, the sensing transmitter node 504 may communicate a set of sensing signals (e.g., (e.g., via the sensing incident wave 512) to the sensing receiver node 506 on one or more different carriers (e.g., CC1-CC4, etc.) based on the UE capability information. Then, the sensing node 504 may transmit sidelink data or control information coordinating bistatic sensing between the nodes on an incident wave (e.g., the sensing incident wave 512). The sensing incident wave 512 may interact with the object 510, in which such sensing signals may reach the sensing receiver node 506 on a sensing reflected wave 514. Thus, the sensing transmitter node 504 may acquire a relatively large bandwidth for bistatic sensing with the sensing receiver node 506 by aggregating the sensing bandwidth of the sensing reflected wave 514 associated with multiple component carriers (e.g., CC1-CC4, etc.).

Thus, as shown in the scenario 500 illustrated in FIG. 5, aggregated sensing bandwidth may improve the ability of wireless nodes to sense objects in an environment using bistatic sensing.

Figure 6:
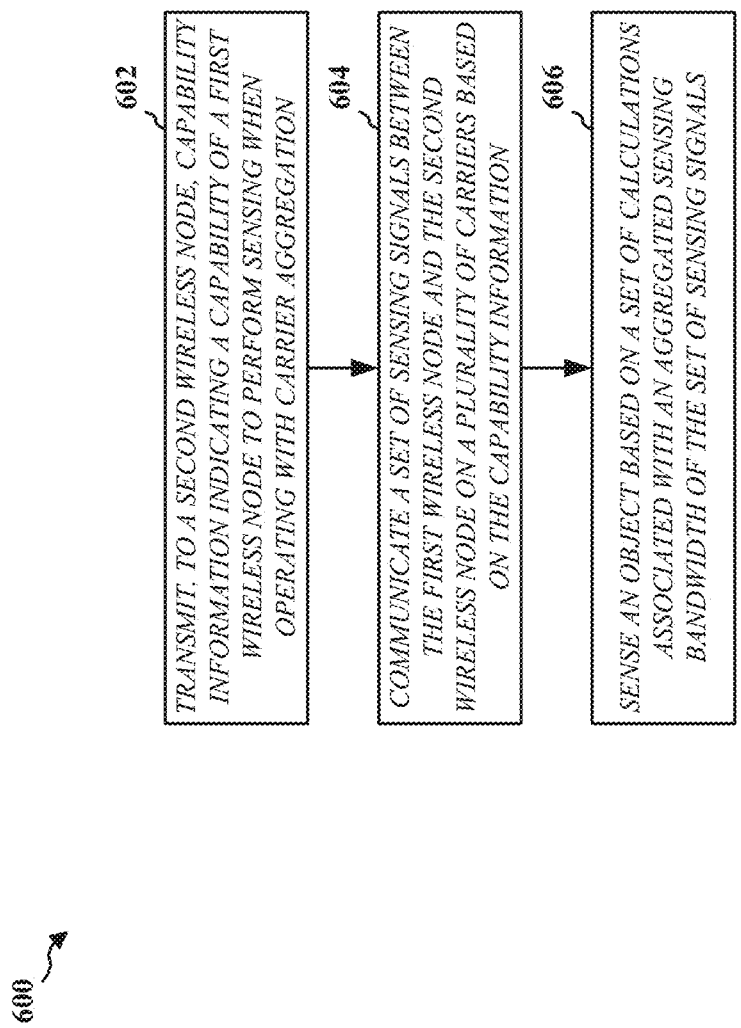
FIG. 6 is a flowchart of a method of bistatic sensing at a wireless node.

FIG. 6 is a flowchart 600 of a method of bistatic sensing at a wireless node. The method may be performed by a UE (e.g., a UE 104, 350, 404, 406, 504, 506), a base station (e.g., the base station 102/180), a wireless node (e.g., one of the nodes 404, 406, 504, 506), an apparatus (e.g., the apparatus 802), or at least one component of any of the foregoing. As illustrated, the flowchart 600 includes a number of enumerated operations, but embodiments of the flowchart 600 may include additional operations before, after, and in between the enumerated operations. In some embodiments, one or more of the enumerated operations may be omitted or performed in a different order. Optional aspects are illustrated with a dashed line. According to different aspects, one or more of the illustrated operations may be transposed and/or contemporaneously performed.

At 602, a first wireless node may transmit, to a second wireless node, capability information indicating that the first wireless node is operating with carrier aggregation. For example, the first wireless node may communicate aggregated sensing bandwidth parameters within the capability information. In one configuration, the capability information may include a parameter indicating a maximum aggregated sensing bandwidth per band. In another configuration, the capability information may include a parameter indicating a maximum aggregated sensing bandwidth per a band combination. In still another configuration, the capability information may include a parameter indicating a maximum aggregated sensing bandwidth per wireless node. In another configuration, the capability information may include a parameter indicating a maximum sensing bandwidth per carrier as a function of a subcarrier spacing. In still another configuration, the capability information may include a parameter indicating that the first wireless node has capability to perform simultaneous sensing on the set of sensing signals as a function of a subcarrier spacing combination. For example, referring to FIGS. 4 and 5, at least one of the first wireless nodes 404, 504 may transmit the capability information to the second wireless node 406, 506.

At 604, the first wireless node may communicate a set of sensing signals on one or more different carriers with the second wireless node based on the capability information. For example, the first wireless node may transmit signals in at least one direction for reflection off an object to be detected by the second wireless node, or the first wireless node may receive signals reflected in at least one direction off the object following transmission by the second wireless node. For example, referring to FIGS. 4 and 5, at least one of the wireless nodes 404, 504 may transmit signals 412, 512 in at least one direction for reflection off object 410, 510 to be detected by the other wireless node 406, 506.

At 606, the first wireless node may sense an object based on a set of calculations associated with an aggregated sensing bandwidth of the set of sensing signals. For example, the first wireless node may aggregate the sensed signals on different carriers and calculate a time difference of arrival (TDoA) between a reference time and a ToA of at least one signal reflected off the object. The first wireless node may then perform bistatic sensing based on the TDoA to obtain at least one of a position of the object and/or an image representing the object. The overall sensing bandwidth of the sensing signals may be based on the capability information associated with the first wireless node. For example, referring to FIGS. 4 and 5, at least one of the wireless nodes 404, 406, 504, 506 may sense the object 410, 510 based on a set of measurements associated with the set of sensing signals 412, 512, 414, 514.

Figure 7:
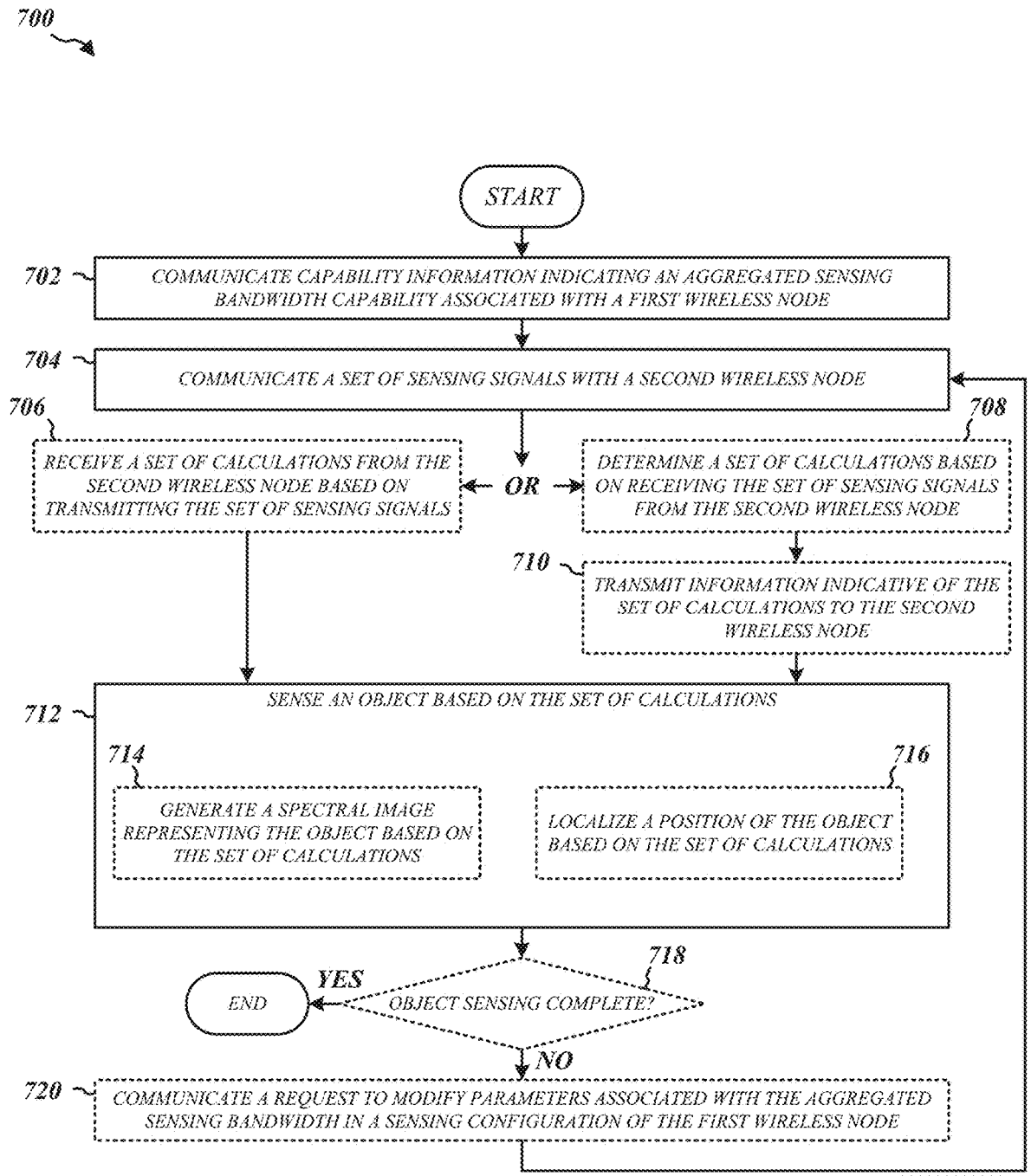
FIG. 7 is a flowchart of another method of bistatic sensing at a wireless node.

FIG. 7 is a flowchart 700 of another method of bistatic sensing at a wireless node. The method may be performed by a UE (e.g., a UE 104, 350, 404, 406, 504, 506), a base station (e.g., the base station 102/180), a wireless node (e.g., one of the nodes 404, 406, 504, 506), an apparatus (e.g., the apparatus 802), or at least one component of any of the foregoing. As illustrated, the flowchart 700 includes a number of enumerated operations, but embodiments of the flowchart 700 may include additional operations before, after, and in between the enumerated operations. In some embodiments, one or more of the enumerated operations may be omitted or performed in a different order. Optional aspects are illustrated with a dashed line. According to different aspects, one or more of the illustrated operations may be transposed and/or contemporaneously performed.

At 702, the first wireless node may communicate capability information indicating an aggregated sensing bandwidth capability associated with the first wireless node to perform sensing when the first wireless node operates with carrier aggregation. For example, the capability information may include one or more parameters indicating the maximum aggregated sensing bandwidth on a per band, per band combination or per UE basis. The capability information also may include one or more parameters indicating the maximum aggregated sensing bandwidth per carrier as a function of a subcarrier spacing.

At 704, the first wireless node may communicate (e.g., transmit or receive) a set of sensing signals between the first wireless node and the second wireless node on multiple carriers based on the capability information.

In some aspects, at 706, the first wireless node may receive a set of calculations from the second wireless node based on transmitting the set of sensing signals.

In some other aspects, at 708, the first wireless node may determine a set of calculations based on receiving the set of sensing signals from the second wireless node. For example, the first wireless node may calculate the range, speed and/or angle of a target object from the aggregated sensing bandwidth of the set of sensing signals. By aggregating the sensing bandwidth, the first wireless node may process the RF sensing measurements with higher resolution and accuracy.

At 710, the first wireless node may transmit information indicative of the set of calculations to the second wireless node.

At 712, one of the wireless nodes may sense an object in the environment based on the set of calculations. In some aspects, at 714, the wireless node made may generate a spectral image representing the object based on the set of calculations. In some other aspects, at the 716, the wireless node may localize a position of the object based on the set of calculations.

At 718, the first wireless node may determine whether object sensing is complete. If the object sensing is complete, then the process is terminated. Otherwise, the process proceeds to operation 720. At 720, the first wireless node may communicate a request to modify one or more parameters associated with the aggregated sensing bandwidth in a sensing configuration of the first wireless node.

Figure 8:
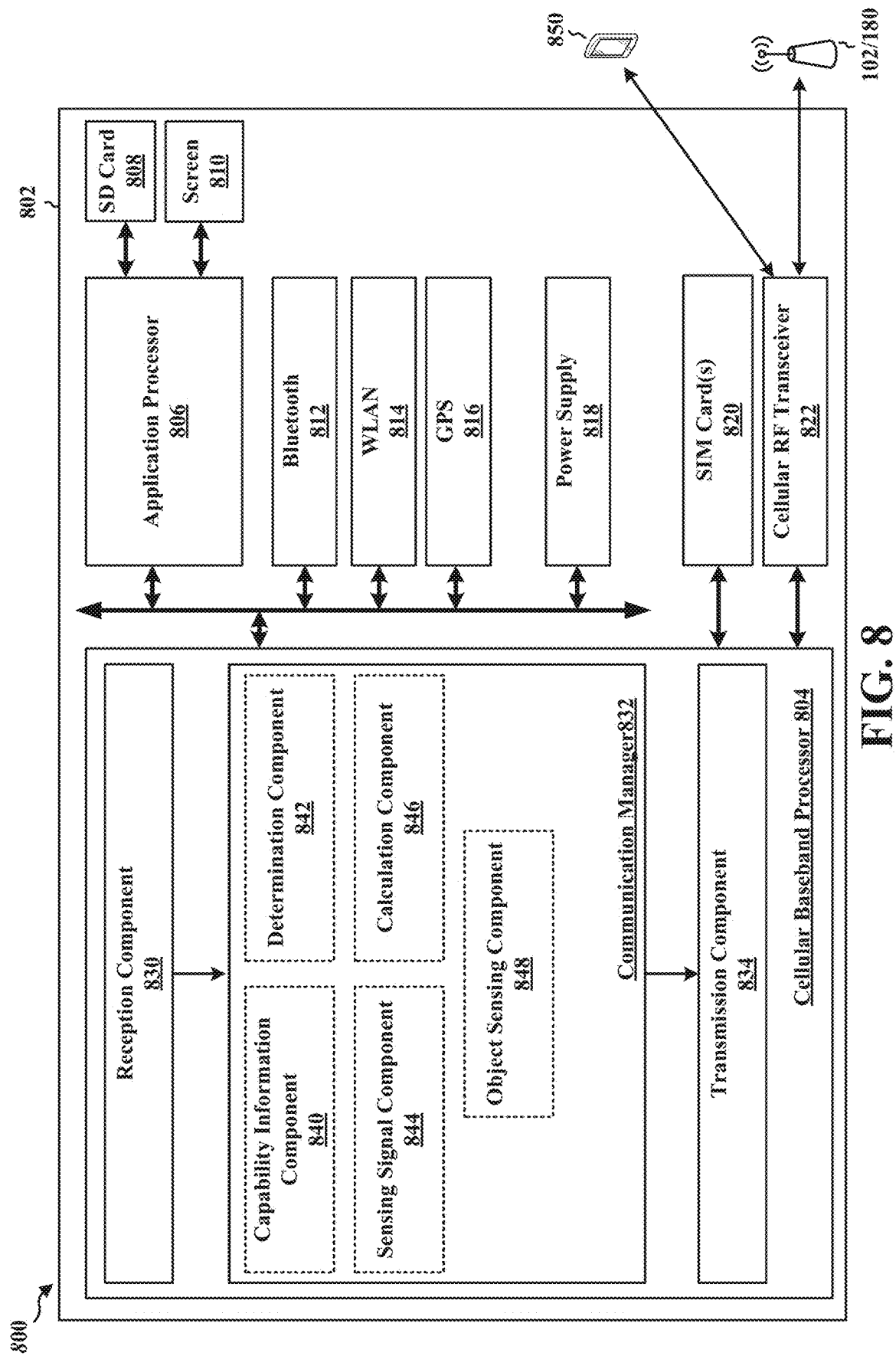
FIG. 8 is a diagram illustrating an example of a hardware implementation for an example apparatus.

FIG. 8 is a diagram 800 illustrating an example of a hardware implementation for an apparatus 802. The apparatus 802 may be a wireless node, such as a UE, a base station, or a component of one of the foregoing, or a similar device. The apparatus 802 may include, inter alia, a cellular baseband processor 804 (also referred to as a modem) and/or a cellular RF transceiver 822, which may be coupled together and/or integrated into the same package or module.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned modules, components, and/or circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 102/180 or UE 104. The transmission component 834 may be configured to transmit signaling on a wireless channel, such as signaling to a base station 102/180 or UE 104. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

The communication manager 832 may include, inter alia, a capability information component 840, a determination component 842, a sensing signal component 844, a calculation component 846, or an object sensing component 848.

The transmission component 834, through cooperation with the capability information component 840, may be configured to transmit capability information indicating that the first wireless node is operating with carrier aggregation to another wireless node 850, e.g., as described in connection with 602 of FIG. 6. In some aspects, the capability information component 840 may generate the capability information to include one or more parameters indicating the maximum aggregated sensing bandwidth per band, per a band combination and/or per wireless node. The capability information component 840 may generate the capability information to include one or more parameters indicating the maximum aggregated sensing bandwidth per carrier as a function of a subcarrier spacing. Additionally, the capability information component 840 may generate the capability information to include one or more parameters indicating that the wireless node has capability to perform simultaneous sensing on the set of sensing signals as a function of a subcarrier spacing combination.

The sensing signal component 844 may communicate (e.g., transmit or receive) a set of sensing signals with the other wireless node 850 based on the capability information, e.g., as described in connection with 604 of FIGS. 6 and/or 704 of FIG. 7.

In some aspects, the reception component 830 may receive a set of calculations from the other wireless node 850 based on transmitting the set of sensing signals, e.g., as described in connection with 706 of FIG. 7.

In some other aspects, the calculation component 846 may determine a set of calculations based on receiving the set of sensing signals from the other wireless node 850, e.g., as described in connection with 708 of FIG. 7. For example, the calculation component 846, through cooperation with the determination component 842, may determine a set of calculations based on receiving the set of sensing signals from the second wireless node. For example, the first wireless node may calculate the range, speed and/or angle of a target object from the aggregated sensing bandwidth of the set of sensing signals.

The transmission component 834 may transmit information indicative of the set of calculations to the other wireless node 850, e.g., as described in connection with 710 of FIG. 7.

The object sensing component 848 may sense an object in the environment based on the set of calculations, e.g., as described in connection with 606 of FIGS. 6 and/or 712 of FIG. 7. In some aspects, the object sensing component 848 made may generate a spectral image representing the object based on the set of calculations, e.g., as described in connection with 714 of FIG. 7. In some other aspects, the object sensing component 848 may localize a position of the object based on the set of calculations, e.g., as described in connection with 716 of FIG. 7.

The object sensing component 848 may determine whether object sensing is complete, e.g., as described in connection with 718 of FIG. 7.

The capability information component 840, through cooperation with the determination component 842, may communicate, via the transmission component 834, a request to modify one or more parameters associated with the aggregated sensing bandwidth in a sensing configuration of the first wireless node.

The apparatus 802 may include additional components that perform some or all of the blocks, operations, signaling, etc. of the algorithm(s) in the aforementioned call flow diagram(s) and/or flowchart(s) of FIGS. 6 and 7. As such, some or all of the blocks, operations, signaling, etc. in the aforementioned call flow diagram(s) and/or flowchart(s) of FIGS. 6 and 7 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for transmitting, to a second wireless node, capability information indicating that the first wireless node is operating with carrier aggregation; means for communicating a set of sensing signals on one or more different carriers with the second wireless node based on the capability information; and sensing an object based on a set of calculations associated with an aggregated sensing bandwidth of the set of sensing signals.

In one configuration, the capability information indicates a maximum aggregated sensing bandwidth per band. In another configuration, the capability information indicates a maximum aggregated sensing bandwidth per a band combination. In still another configuration, the capability information indicates a maximum aggregated sensing bandwidth per wireless node. In one configuration, the capability information indicates a maximum sensing bandwidth per carrier as a function of a subcarrier spacing.

In one configuration, the capability information indicates that the first wireless node has capability to perform simultaneous sensing on the set of sensing signals as a function of a subcarrier spacing combination.

In one configuration, the apparatus 802, and in particular the cellular baseband processor 804, includes means for determining whether simultaneous sensing of the set of sensing signals on the one or more different carriers is supported on the first wireless node; means for generating the capability information comprising a first indication of a simultaneous sensing capability for the first wireless node when the simultaneous sensing of the set of sensing signals on the one or more different carriers is supported on the first wireless node; and means for generating the capability information comprising a second indication of a non-simultaneous sensing capability for the first wireless node when the simultaneous sensing of the set of sensing signals on the one or more different carriers is not supported on the first wireless node, in which the non-simultaneous sensing capability includes time-division multiplex sensing on the one or more different carriers.

In one configuration, the capability information indicates one or more of a maximum aggregated sensing bandwidth, a maximum sensing bandwidth per carrier or a simultaneous sensing capability, in which the maximum aggregated sensing bandwidth is different between the simultaneous sensing capability and the non-simultaneous sensing capability.

In one configuration, the apparatus 802, and in particular the cellular baseband processor 804, includes means for transmitting, to the second wireless node, a request for modifying a sensing configuration associated with the first wireless node; and means for receiving a response to the request from the second wireless node, in which the response indicates a modification in one or more parameters associated with the aggregated sensing bandwidth.

In one configuration, the request indicates a change in one or more of a maximum aggregated sensing bandwidth parameter of the sensing configuration or a maximum sensing bandwidth per carrier parameter of the sensing configuration.

In one configuration, the apparatus 802, and in particular the cellular baseband processor 804, includes means for generating the capability information based at least in part on a resource pool indicating aggregation capability of radio resources associated with the first wireless node for sensing bandwidth aggregation.

In one configuration, the set of calculations comprises at least one of a time of arrival (ToA) associated with at least one of the set of sensing signals, an angle of arrival (AoA) associated with the at least one of the set of sensing signals, a time difference of arrival (TDoA) between at least two of the set of sensing signals, a position of the object, or a channel impulse response (CIR) on at least one communication channel.

In one configuration, the apparatus 802, and in particular the cellular baseband processor 804, includes means for receiving the set of calculations from the second wireless node based on transmitting the set of sensing signals.

In one configuration, the apparatus 802, and in particular the cellular baseband processor 804, includes means for determining the set of calculations based on receiving the set of sensing signals from the second wireless node; and transmitting the set of calculations to the second wireless node.

In one configuration, the means for sensing the object based on the set of calculations associated with the set of sensing signals is configured to generate a spectral image representing the object based on the set of calculations associated with the set of sensing signals.

In one configuration, the means for the sensing the object based on the set of calculations associated with the set of sensing signals is configured to localize a position of the object based on the set of calculations associated with the set of sensing signals, and the position comprises at least one of a distance relative to a position of the first wireless node, a distance relative to a position of the second wireless node, a set of coordinates indicating a position of the object with respect to a relative frame of reference, or a set of geographic coordinates.

In some aspects, the aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some other aspects, the aforementioned means may be one or more of the aforementioned components of the apparatus 802 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a first wireless node that includes transmitting, to a second wireless node, capability information indicating a capability of the first wireless node to perform sensing when operating with carrier aggregation; communicating a set of sensing signals on a plurality of carriers between the first wireless node and the second wireless node based on the capability information; and sensing an object based on a set of calculations associated with an aggregated sensing bandwidth of the set of sensing signals.

In Aspect 2, the method of Aspect 1 further includes that the capability information indicates a maximum aggregated sensing bandwidth per band.

In Aspect 3, the method of Aspect 1 or Aspect 2 further includes that the capability information indicates a maximum aggregated sensing bandwidth per a band combination.

In Aspect 4, the method of any of Aspects 1-3 further includes that the capability information indicates a maximum aggregated sensing bandwidth per wireless node.

In Aspect 5, the method of any of Aspects 1-4 further includes that the capability information indicates a maximum sensing bandwidth per carrier as a function of a subcarrier spacing.

In Aspect 6, the method of any of Aspects 1-5 further includes that the capability information indicates that the first wireless node has capability to perform simultaneous sensing on the set of sensing signals as a function of a subcarrier spacing combination.

In Aspect 7, the method of any of Aspects 1-6 further includes determining whether simultaneous sensing of the set of sensing signals on the one or more different carriers is supported on the first wireless node; generating the capability information comprising a first indication of a simultaneous sensing capability for the first wireless node when the simultaneous sensing of the set of sensing signals on the one or more different carriers is supported on the first wireless node; and generating the capability information comprising a second indication of a non-simultaneous sensing capability for the first wireless node when the simultaneous sensing of the set of sensing signals on the one or more different carriers is not supported on the first wireless node, wherein the non-simultaneous sensing capability includes time-division multiplex sensing on the one or more different carriers.

In Aspect 8, the method of any of Aspects 7 further includes that the capability information indicates one or more of a maximum aggregated sensing bandwidth, a maximum sensing bandwidth per carrier or a simultaneous sensing capability, wherein the maximum aggregated sensing bandwidth is different between the simultaneous sensing capability and the non-simultaneous sensing capability.

In Aspect 9, the method of any of Aspects 1-8 further includes transmitting, to the second wireless node, a request for modifying a sensing configuration associated with the first wireless node; and receiving a response to the request from the second wireless node, wherein the response indicates a modification in one or more parameters associated with the aggregated sensing bandwidth.

In Aspect 10, the method of any of Aspects 9 further includes that the request indicates a change in one or more of a maximum aggregated sensing bandwidth parameter of the sensing configuration or a maximum sensing bandwidth per carrier parameter of the sensing configuration.

In Aspect 11, the method of any of Aspects 1-10 further includes generating the capability information based at least in part on a resource pool indicating aggregation capability of radio resources associated with the first wireless node for sensing bandwidth aggregation.

In Aspect 12, the method of any of Aspects 1-11 further includes that the set of calculations comprises at least one of a time of arrival (ToA) associated with at least one of the set of sensing signals, an angle of arrival (AoA) associated with the at least one of the set of sensing signals, a time difference of arrival (TDoA) between at least two of the set of sensing signals, a position of the object, or a channel impulse response (CIR) on at least one communication channel.

In Aspect 13, the method of Aspect 12 further includes receiving the set of calculations from the second wireless node based on transmitting the set of sensing signals.

In Aspect 14, the method of Aspect 12 further includes determining the set of calculations based on receiving the set of sensing signals from the second wireless node; and transmitting the set of calculations to the second wireless node.

In Aspect 15, the method of any of Aspects 1-14 further includes that the sensing the object based on the set of calculations associated with the set of sensing signals comprises generating a spectral image representing the object based on the set of calculations associated with the set of sensing signals.

In Aspect 16, the method of any of Aspects 1-15 further includes that the sensing the object based on the set of calculations associated with the set of sensing signals comprises localizing a position of the object based on the set of calculations associated with the set of sensing signals, and the position comprises at least one of a distance relative to a position of the first wireless node, a distance relative to a position of the second wireless node, a set of coordinates indicating a position of the object with respect to a relative frame of reference, or a set of geographic coordinates.

Aspect 17 is a device including one or more processors and one or more memories in electronic communication with the one or more processors storing instructions executable by the one or more processors to cause the device to implement a method as in any of Aspects 1-16.

Aspect 18 is a system or apparatus including means for implementing a method or realizing an apparatus as in any of Aspects 1-16.

Aspect 19 is a non-transitory computer readable medium storing instructions executable by one or more processors to cause the one or more processors to implement a method as in any of Aspects 1-16.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

What is claimed is:

1. A method of wireless communication at a first wireless node, comprising:
   transmitting, to a second wireless node, capability information indicating a capability of the first wireless node to perform object sensing when operating with carrier aggregation;
   communicating a set of sensing signals on a plurality of carriers between the first wireless node and the second wireless node based on the capability information; and
   sensing an object based on a set of calculations associated with an aggregated sensing bandwidth of the set of sensing signals;
   wherein the sensing the object based on the set of calculations associated with the aggregated sensing bandwidth of the set of sensing signals comprises localizing a position of the object based on the set of calculations associated with the aggregated sensing bandwidth of the set of sensing signals,
   wherein the set of calculations comprises at least one of a time of arrival (ToA) associated with the aggregated sensing bandwidth of at least one of the set of sensing signals, an angle of arrival (AoA) associated with the aggregated sensing bandwidth of the at least one of the set of sensing signals, a time difference of arrival (TDoA) between at least two of the set of sensing signals and associated with the aggregated sensing bandwidth of the at least two of the set of sensing signals, or a channel impulse response (CIR) associated with the aggregated sensing bandwidth on at least one communication channel, and
   wherein the position comprises at least one of a distance relative to a position of the first wireless node, a distance relative to a position of the second wireless node, a set of coordinates indicating a position of the object with respect to a relative frame of reference, or a set of geographic coordinates.

2. The method of claim 1, wherein:
   the capability information comprises a first indication of a simultaneous sensing capability for the first wireless node when simultaneous sensing of the set of sensing signals on the plurality of carriers is supported on the first wireless node, and
   the capability information comprises a second indication of a non-simultaneous sensing capability for the first wireless node when the simultaneous sensing of the set of sensing signals on the plurality of carriers is not supported on the first wireless node, wherein the non-simultaneous sensing capability includes time-division multiplex sensing on the plurality of carriers.

3. The method of claim 2, wherein the capability information indicates one or more of a maximum aggregated sensing bandwidth, a maximum sensing bandwidth per carrier or the simultaneous sensing capability, wherein the maximum aggregated sensing bandwidth is different between the simultaneous sensing capability and the non-simultaneous sensing capability.

4. The method of claim 1, further comprising:
   transmitting, to the second wireless node, a request for modifying a sensing configuration associated with the first wireless node; and
   receiving a response to the request from the second wireless node,
   wherein the response indicates a modification in one or more parameters associated with the aggregated sensing bandwidth.

5. The method of claim 4, wherein the request indicates a change in one or more of a maximum aggregated sensing bandwidth parameter of the sensing configuration or a maximum sensing bandwidth per carrier parameter of the sensing configuration.

6. The method of claim 1, further comprising reporting the capability information to the second wireless node based at least in part on a resource pool indicating aggregation capability of radio resources associated with the first wireless node for sensing bandwidth aggregation.

7. The method of claim 1, wherein the capability information indicates a maximum aggregated sensing bandwidth per band.

8. The method of claim 1, wherein the capability information indicates a maximum aggregated sensing bandwidth per band combination.

9. The method of claim 1, wherein the capability information indicates a maximum aggregated sensing bandwidth per wireless node.

10. The method of claim 1, wherein the capability information indicates a maximum sensing bandwidth per carrier as a function of a subcarrier spacing.

11. The method of claim 1, wherein the capability information indicates that the first wireless node supports simultaneous sensing on the set of sensing signals as a function of subcarrier spacing.

12. The method of claim 1, further comprising:
receiving the set of calculations from the second wireless node based on transmitting the set of sensing signals.

13. The method of claim 1, further comprising:
determining the set of calculations based on receiving the set of sensing signals from the second wireless node; and
transmitting the set of calculations to the second wireless node.

14. The method of claim 1, wherein sensing the object based on the set of calculations associated with the set of sensing signals further comprises:
generating a spectral image representing the object based on the set of calculations associated with the set of sensing signals.

15. An apparatus for wireless communication at a first wireless node, comprising:
one or more memories;
a transceiver; and
at least one processor, each coupled to at least one of the one or more memories and to the transceiver, the at least one processor being configured to, individually or in combination:
transmit, to a second wireless node, via the transceiver, capability information indicating a capability of the first wireless node to perform object sensing when operating with carrier aggregation;
communicate, via the transceiver, a set of sensing signals on a plurality of carriers between the first wireless node and the second wireless node based on the capability information; and
sense an object based on a set of calculations associated with an aggregated sensing bandwidth of the set of sensing signals;
wherein the sensing the object based on the set of calculations associated with the aggregated sensing bandwidth of the set of sensing signals comprises to localize a position of the object based on the set of calculations associated with the aggregated sensing bandwidth of the set of sensing signals,
wherein the set of calculations comprises at least one of a time of arrival (ToA) associated with the aggregated sensing bandwidth of at least one of the set of sensing signals, an angle of arrival (AoA) associated with the aggregated sensing bandwidth of the at least one of the set of sensing signals, a time difference of arrival (TDoA) between at least two of the set of sensing signals and associated with the aggregated sensing bandwidth of the at least two of the set of sensing signals, or a channel impulse response (CIR) associated with the aggregated sensing bandwidth on at least one communication channel, and
wherein the position comprises at least one of a distance relative to a position of the first wireless node, a distance relative to a position of the second wireless node, a set of coordinates indicating a position of the object with respect to a relative frame of reference, or a set of geographic coordinates.

16. The apparatus of claim 15, wherein the capability information indicates a maximum aggregated sensing bandwidth per band.

17. The apparatus of claim 15, wherein the capability information indicates a maximum aggregated sensing bandwidth per a band combination.

18. The apparatus of claim 15, wherein the capability information indicates a maximum aggregated sensing bandwidth per wireless node.

19. The apparatus of claim 15, wherein the capability information indicates a maximum sensing bandwidth per carrier as a function of a subcarrier spacing.

20. The apparatus of claim 15, wherein the capability information indicates that the first wireless node supports simultaneous sensing on the set of sensing signals as a function of subcarrier spacing.

21. The apparatus of claim 15, wherein:
the capability information comprises a first indication of a simultaneous sensing capability for the first wireless node when simultaneous sensing of the set of sensing signals on the plurality of carriers is supported on the first wireless node,
the capability information comprises a second indication of a non-simultaneous sensing capability for the first wireless node when simultaneous sensing of the set of sensing signals on the plurality of carriers is not supported on the first wireless node, wherein the non-simultaneous sensing capability includes time-division multiplex sensing on the plurality of carriers, and
the capability information indicates one or more of a maximum aggregated sensing bandwidth, a maximum sensing bandwidth per carrier or the simultaneous sensing capability, wherein the maximum aggregated sensing bandwidth is different between the simultaneous sensing capability and the non-simultaneous sensing capability.

22. The apparatus of claim 15, wherein the at least one processor is further configured to, individually or in combination:
transmit, to the second wireless node, via the transceiver, a request for modifying a sensing configuration associated with the first wireless node; and
receive, via the transceiver, a response to the request from the second wireless node.

23. The apparatus of claim 22, wherein:
the response indicates a modification in one or more parameters associated with the aggregated sensing bandwidth, and
the request indicates a change in one or more of a maximum aggregated sensing bandwidth parameter of the sensing configuration or a maximum sensing bandwidth per carrier parameter of the sensing configuration.

24. The apparatus of claim 15, wherein the at least one processor is further configured to, individually or in combination, report the capability information to the second wireless node based at least in part on a resource pool indicating aggregation capability of radio resources associated with the first wireless node for sensing bandwidth aggregation.

25. The apparatus of claim 15, wherein the at least one processor is further configured to, individually or in combination:
receive, via the transceiver, the set of calculations from the second wireless node based on transmitting the set of sensing signals;
determine the set of calculations based on receiving the set of sensing signals from the second wireless node; and transmit, via the transceiver, the set of calculations to the second wireless node, wherein the sensing the object based on the set of calculations associated with the set of sensing signals further comprises to generate a spectral image representing the object based on the set of calculations associated with the set of sensing signals.

26. An apparatus of wireless communication at a first wireless node, comprising:

means for transmitting, to a second wireless node, capability information indicating a capability of the first wireless node to perform object sensing when operating with carrier aggregation;

means for communicating a set of sensing signals on a plurality of carriers between the first wireless node and the second wireless node based on the capability information; and means for sensing an object based on a set of calculations associated with an aggregated sensing bandwidth of the set of sensing signals;

wherein the sensing the object based on the set of calculations associated with the aggregated sensing bandwidth of the set of sensing signals comprises to localize a position of the object based on the set of calculations associated with the aggregated sensing bandwidth of the set of sensing signals, wherein the set of calculations comprises at least one of a time of arrival (ToA) associated with the aggregated sensing bandwidth of at least one of the set of sensing signals, an angle of arrival (AoA) associated with the aggregated sensing bandwidth of the at least one of the set of sensing signals, a time difference of arrival (TDoA) between at least two of the set of sensing signals and associated with the aggregated sensing bandwidth of the at least two of the set of sensing signals, or a channel impulse response (CIR) associated with the aggregated sensing bandwidth on at least one communication channel, and wherein the position comprises at least one of a distance relative to a position of the first wireless node, a distance relative to a position of the second wireless node, a set of coordinates indicating a position of the object with respect to a relative frame of reference, or a set of geographic coordinates.

27. One or more non-transitory computer-readable media comprising computer-executable code for wireless communication at a first wireless node, the code when executed by at least one processor, causes the at least one processor to, individually or in combination:

transmit, to a second wireless node, capability information indicating a capability of the first wireless node to perform object sensing when operating with carrier aggregation;

communicate a set of sensing signals on a plurality of carriers between the first wireless node and the second wireless node based on the capability information; and sense an object based on a set of calculations associated with an aggregated sensing bandwidth of the set of sensing signals;

wherein the sensing the object based on the set of calculations associated with the aggregated sensing bandwidth of the set of sensing signals comprises to localize a position of the object based on the set of calculations associated with the aggregated sensing bandwidth of the set of sensing signals, wherein the set of calculations comprises at least one of a time of arrival (ToA) associated with the aggregated sensing bandwidth of at least one of the set of sensing signals, an angle of arrival (AoA) associated with the aggregated sensing bandwidth of the at least one of the set of sensing signals, a time difference of arrival (TDoA) between at least two of the set of sensing signals and associated with the aggregated sensing bandwidth of the at least two of the set of sensing signals, or a channel impulse response (CIR) associated with the aggregated sensing bandwidth on at least one communication channel, and wherein the position comprises at least one of a distance relative to a position of the first wireless node, a distance relative to a position of the second wireless node, a set of coordinates indicating a position of the object with respect to a relative frame of reference, or a set of geographic coordinates.

\* \* \* \* \*